(12) United States Patent
Coeck et al.

(10) Patent No.: US 11,433,604 B2
(45) Date of Patent: Sep. 6, 2022

(54) THREE-DIMENSIONAL PRINTING SYSTEM WITH LASER CONVERGENCE CALIBRATION BASED UPON ACOUSTIC ANALYSIS

(71) Applicant: LayerWise NV, Leuven (BE)

(72) Inventors: Sam Coeck, Vertrijk (BE); Karel Lietaert, Kortrijk (BE); Nachiketa Ray, Leuven (BE); Anh Dung Nguyen, Brussels (BE); Gokula Krishna Muralidharan, Ghent (BE); Jonas Van Vaerenbergh, Nieuwkerken-Waas (BE)

(73) Assignee: LAYERWISE NV, Leuven (BE)

( * ) Notice: Subject to any disclaimer, the term of this patent is extended or adjusted under 35 U.S.C. 154(b) by 208 days.

(21) Appl. No.: 16/944,855

(22) Filed: Jul. 31, 2020

(65) Prior Publication Data

US 2021/0031445 A1 Feb. 4, 2021

(30) Foreign Application Priority Data

Aug. 2, 2019 (EP) .................................... 19189728
Jul. 7, 2020 (EP) .................................... 20184541

(51) Int. Cl.
*B29C 64/153* (2017.01)
*B29C 64/268* (2017.01)
(Continued)

(52) U.S. Cl.
CPC .......... *B29C 64/153* (2017.08); *B29C 64/205* (2017.08); *B29C 64/232* (2017.08);
(Continued)

(58) Field of Classification Search
CPC .................................................. B29C 64/364
See application file for complete search history.

(56) References Cited

U.S. PATENT DOCUMENTS 4,960,970 A * 10/1990 Schneiter ............. B23K 26/382
219/121.68
2017/0293259 A1 10/2017 Ochiai
(Continued)

FOREIGN PATENT DOCUMENTS

WO 2016094827 6/2016
WO 2016198885 A1 12/2016
(Continued)

OTHER PUBLICATIONS

European Patent Office, "Extended European Search Report for European Patent Application No. 19189728.9", dated Feb. 11, 2020, 7 pages.

*Primary Examiner* — Timothy Kennedy

(57) ABSTRACT

A method of manufacturing a three-dimensional article includes: (1) Loading a metal platen into a build chamber, the metal platen defines an upper surface; (2) Performing concurrent processes including operating a movement mechanism to vertically translate the platen, operating a laser system to impinge a radiation beam upon the upper surface of the platen, and receiving a signal from an acoustic sensor that is positioned within the build chamber; (3) Analyzing the signal including determining a height of optimal laser convergence for the platen; and (4) Based upon the analysis, adjusting the laser convergence height to a build plane height.

20 Claims, 3 Drawing Sheets

(51) Int. Cl.
    *B29C 64/245*     (2017.01)
    *B29C 64/232*     (2017.01)
    *B29C 64/393*     (2017.01)
    *B29C 64/371*     (2017.01)
    *B29C 64/205*     (2017.01)
    *B29C 64/25*     (2017.01)
    *B33Y 50/02*     (2015.01)
    *B33Y 10/00*     (2015.01)
    *B33Y 30/00*     (2015.01)

(52) U.S. Cl.
    CPC ............ *B29C 64/245* (2017.08); *B29C 64/25* (2017.08); *B29C 64/268* (2017.08); *B29C 64/371* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

2018/0072000 A1    3/2018  Riemann
2018/0154484 A1    6/2018  Hall
2018/0207750 A1    7/2018  Carter

FOREIGN PATENT DOCUMENTS

WO    2018087556 A1    5/2018
WO    2019055576 A1    3/2019

\* cited by examiner

THREE-DIMENSIONAL PRINTING SYSTEM WITH LASER CONVERGENCE CALIBRATION BASED UPON ACOUSTIC ANALYSIS

CROSS-REFERENCE TO RELATED APPLICATIONS

This application claims the benefit of priority through the Paris convention to European application 19189728.9 filed on Aug. 2, 2019, and to European application 20184541.9, filed Jul. 7, 2020. These prior application are incorporated herein by reference.

FIELD OF THE INVENTION

The present disclosure concerns an apparatus and method for a layer-by-layer fabrication of three dimensional (3D) articles utilizing powder materials. More particularly, the present disclosure concerns a method of calibrating a convergence of a radiation beam used to consolidate layers of the powder materials.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered materials. Each layer of powdered material is selectively fused at a build plane using an energy beam such as a laser, electron, or particle beam. Higher productivity printers can utilize multiple energy beams. One challenge with these systems is properly converging an energy beam at the build plane.

WO 2016/198885 describes a 3D printing system for building an object by layerwise consolidation of material. The apparatus comprising a build chamber containing a build support for supporting the object during the build, a material source for providing material to selected locations for consolidation, an energy beam device for generating and directing an energy beam to consolidate the material at the selected locations. Further, the system comprises an acoustic sensing system. The acoustic sensing system may be arranged to detect acoustic signals generated in the build enclosure by consolidation of the material with the radiation. The acoustic sensing system may be a passive acoustic sensing system arranged to detect acoustic signals generated in the build enclosure that are indicative of at least one condition of the building process and/or the object.

SUMMARY

In a first aspect of the disclosure, a method of manufacturing a three-dimensional article includes: (1) loading a metal platen into a build chamber, the metal platen defining an upper surface, (2) performing concurrent processes including (2A) operating a movement mechanism to vertically translate the platen, (2B) operating a laser system to impinge a radiation beam upon the upper surface of the platen, and (2C) receiving a signal from an acoustic sensor that is positioned within the build chamber, (3) analyzing the signal including determining a height of maximum laser convergence for the platen, (4) based upon the analysis, adjusting the maximum laser convergence height to a build plane height.

In one implementation, the upper surface of the platen is made of titanium. In other embodiments, the upper surface of the platen can be made of other metals such as stainless steel, invar, or other metals.

In various implementations, the translation of the platen can vary. The translation can be monotonically upward, monotonically downward, variably up and down, or any other programmed motion.

In another implementation, determining a height of optimal laser convergence includes identifying a platen height corresponding to a maximized acoustic signal indicated by the acoustic sensor.

In yet another implementation, the concurrent processes are performed when ambient air is within the build chamber. After the concurrent processes, the build chamber can be evacuated and backfilled with an inert gas such as argon. After the backfill, the method can further include operating the movement mechanism to position the upper surface of the metal platen near the build plane, operating a powder dispenser to dispense a layer of powder over the upper surface, operating the laser system to selectively melt the layer of powder, and repeating operating the movement mechanism, the powder dispenser, and the laser to complete fabrication of the article.

In a second aspect of the disclosure, a three-dimensional printing system for manufacturing a three-dimensional article includes a build chamber, a metal platen loaded into the build chamber, the metal platen defining an upper surface, a laser system, an acoustic sensor positioned within the build chamber, and a controller. The controller is configured to (1) perform concurrent processes including (1A) operate the movement mechanism to vertically translate the platen, (1B) operate the laser system to impinge a radiation beam upon the upper surface of the platen, and (1C) receive a signal from the acoustic sensor, (2) analyze the signal including determining a height of maximum laser convergence for the platen, and (3) based upon the analysis, adjust the laser convergence height to a build plane height.

DETAILED DESCRIPTION OF THE PREFERRED EMBODIMENTS

Figure 1:
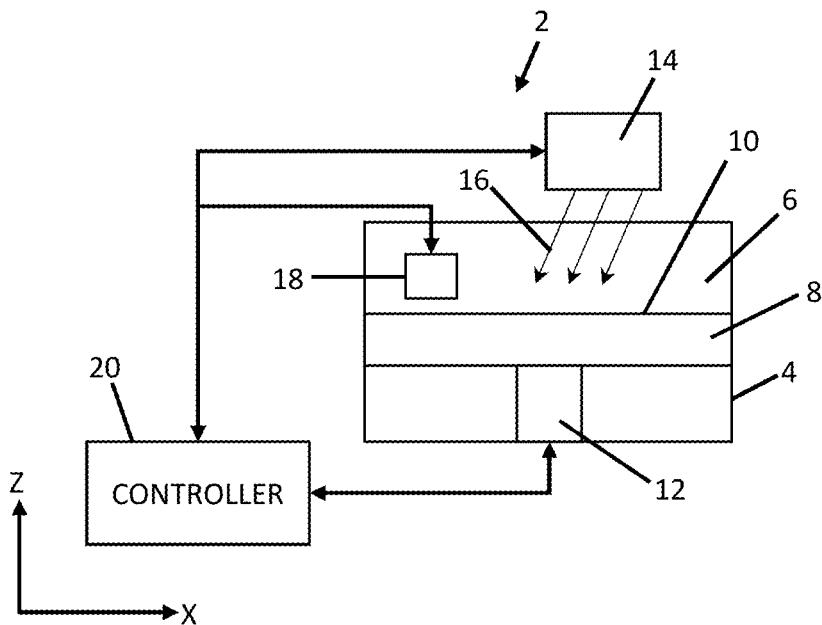
FIG. 1 is a schematic diagram of a three-dimensional printing system during a calibration process.

FIG. 1 is a schematic diagram of a three-dimensional printing system 2 during a calibration process according to the current disclosure. In describing system 2, mutually orthogonal axes X, Y, and Z can be used. Axes X and Y are lateral axes and generally horizontal. Axis Z is a vertical axis that is generally aligned with a gravitational reference. By "generally" we mean that a measure such as a quantity, a dimensional comparison, or an orientation comparison is by design and within manufacturing tolerances but as such may not be exact.

System 2 includes a build module 4 defining an internal build chamber 6. During the calibration process the build chamber 6 is filled with a gas that is the same or similar to an outside atmosphere. The outside atmosphere includes about 21 molar percent oxygen and 78 molar percent nitrogen. Near sea level, the oxygen would have a partial pressure of about 0.2 atmosphere. It has been found that the calibration process can be more effective and accurate with this partial pressure of oxygen or with the ambient atmospheric pressure and composition.

Within the build chamber 6 is a motorized platen 8 having an upper surface 10. In an illustrative embodiment, the upper surface 10 is titanium. Platen 8 is motorized because it is vertically positioned by movement mechanism 12. In the illustrative embodiment, the entire platen 8 and/or the upper surface 10 is made of titanium. Other metals for platen 8 and/or upper surface 10 can be used such as stainless steel, invar, nickel, alloys, or other metals.

A beam system 14 is configured to generate one or more energy beams 16. Energy beams 16 are to be focused on a build plane during a fabrication process. The energy beams 16 can converge and then diverge as they project from the laser system 14. A point of optimal convergence for the beams 16 is to be on the build plane during fabrication. In an illustrative embodiment, energy beams 14 are laser radiation beams 14. During the calibration process, the beams 14 are directed to the upper surface 10 of platen 8.

An acoustic sensor 18 is disposed within the build chamber 6. Acoustic sensor 18 generates a signal that is indicative of acoustic waves or sound waves generated in the build chamber 6. In particular, the acoustic sensor 18 is responsive to acoustic signals generated at surface 10 when beam(s) 16 impinge upon surface 10.

A controller 20 is configured to control movement mechanism 12, laser system 14, acoustic sensor 18, and other portions of system 2. Controller 20 includes a processor coupled to an information storage device. The information storage device includes a non-volatile or non-transient storage device storing software instructions. When executed by the processor, the software instructions control movement mechanism 12, laser system 14, acoustic sensor 18, and other portions of system 2.

Figure 2:
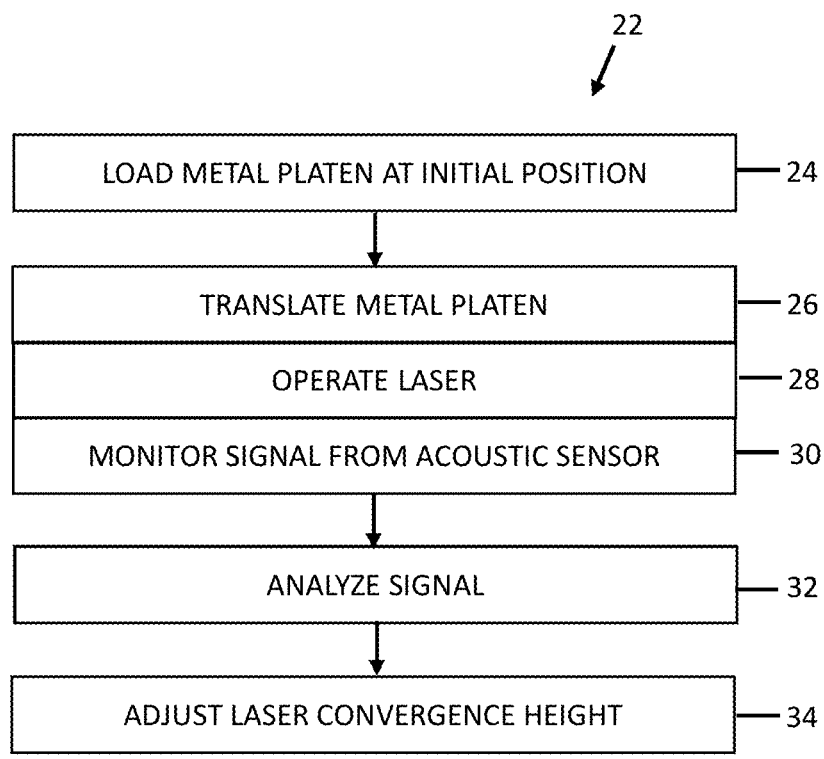
FIG. 2 is a flowchart depicting a calibration process for a three-dimensional printing system.

FIG. 2 is a flowchart depicting a calibration process 22 performed with respect to system 2. According to 24, the metal platen 8 is loaded into the build chamber 6. Also according to 24, the surface 10 is positioned at an initial position for the calibration process 22. During calibration process 22, an oxygen containing environment such as ambient air is within the build chamber 6. Further, the upper surface 10 of platen 8 is powder free. During the calibration process 22 no powder is dispensed onto the platen 8 and therefore during the steps of the calibration process 22, the energy beams 16 directly imping the solid upper surface 10 of the platen 8.

Figure 3:
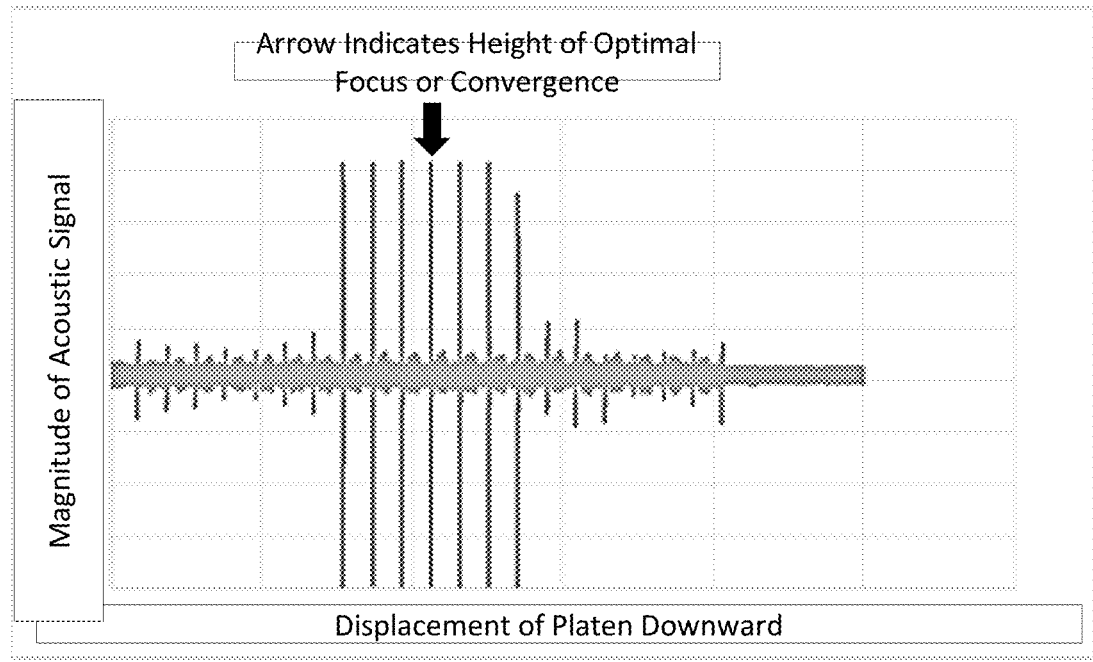
FIG. 3 is graph depicting an acoustic signal as function of platen position. The horizontal axis from left to right is indicative of a decreasing height of an upper surface of the platen. The vertical axis is indicative of a magnitude of the acoustic signal.

According to 26, 28, and 30, a set of processes are performed concurrently (at the same time). According to 26, the movement mechanism 12 is operated to translate the surface 10. The translation can be upward, downward, or both up and down. According to 28, the laser system 14 is operated to impinge an energy beam 16 upon the solid and powder free surface 10. According to 30, the controller 20 receives a signal from the acoustic sensor 18. FIG. 3 illustrates a signal versus time received from the acoustic sensor 18.

According to 32, the signal from acoustic sensor 18 is analyzed to determine a height of surface 10 for which an optimal laser convergence occurs. This is the height of surface 10 when the beam 16 is most focused or converged.

FIG. 3 depicts a signal from sensor 18 versus time when the platen is displaced downwardly. The horizontal axis is proportional to a displacement of the platen downward. The vertical axis is proportional to a magnitude of an acoustic signal. The signal becomes much stronger when the surface 10 is at or near the laser focus. This is represented by the seven tallest spikes. The black arrow represents an approximate surface 10 height at which the laser is most focused on surface 10. Ideally, this height coincides with the build plane at which material is to be solidified. If not, then a difference between the arrowed height and the height of the build plane represents an error magnitude. According to 34, the laser is adjusted so that the optimized convergence or focused height coincides with the build plane for system 2. Since the energy beams are impinging the solid upper surface 10 a strong, clear and distinguishable acoustic signal is generated. Therein, the acoustic signal more pronounced due to the solid surface than it would be for powder.

Figure 4:
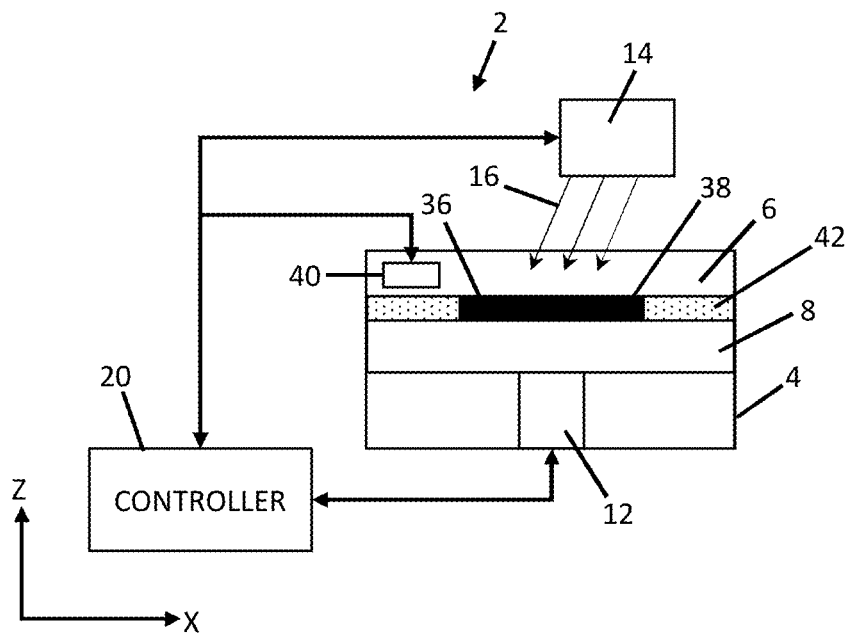
FIG. 4 is a schematic diagram of a three-dimensional printing system during a fabrication process.

FIG. 4 is a schematic diagram of a three-dimensional printing system 2 during a manufacturing or fabrication process of a three-dimensional article 36. In comparing FIGS. 1 and 4, like element numbers indicate like elements except for differences due to the fabrication process (FIG. 4) versus the calibration process (FIG. 1).

During fabrication, the build chamber 6 has been evacuated and back filled with an inert gas such as argon. The energy beams 16 are focused on the build plane 38 as a result of the calibration process 22. System 2 includes a powder dispenser 40 for dispensing layers of powder 42 at build plane 38. More specifically, the build plane 38 is at the top surface of a just-dispensed layer of powder 42.

Figure 5:
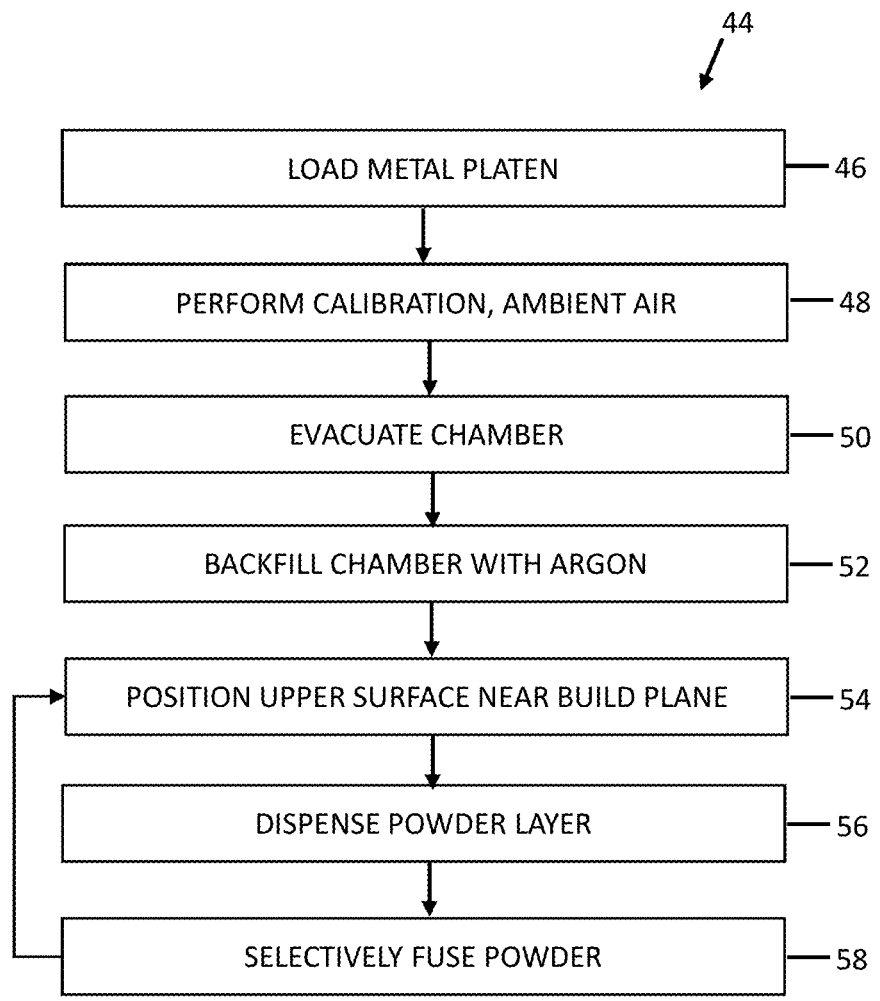
FIG. 5 is a flowchart depicting an overall manufacturing process that includes both a calibration and a fabrication process.

FIG. 5 depicts an overall manufacturing process that includes both calibration of beam generators 14 and fabrication of the three-dimensional article 36. Step 48 of FIG. 5 corresponds to the calibration method 22 and to the calibration configuration of FIG. 1. Steps 54-58 correspond to the fabrication configuration of FIG. 4.

According to 46, a metal platen is loaded into the build chamber 6. According to 48, calibration is performed. In the illustrated embodiment, the build chamber contains ambient (outside atmospheric air) in step 48. In a further illustrative embodiment, step 48 includes the calibration method 22 of FIG. 2.

According to 50, the build chamber 6 is evacuated. According to 52, the build chamber 6 is backfilled with argon.

According to 54, the upper surface 10 is positioned near the build plane 38 or one powder layer thickness below the build plane. According to 56, a layer of powder 42 is dispensed at the build plane 38 (an upper surface of the powder layer defines the build plane 38). According to 58, the energy beam(s) 16 are operated to selectively fuse the layer of powder dispensed during step 56. As indicated by the flowchart, steps 54-58 are repeated until the three-dimensional article 36 is fabricated.

The specific embodiments and applications thereof described above are for illustrative purposes only and do not preclude modifications and variations encompassed by the scope of the following claims.

What is claimed:
1. A method of manufacturing a three-dimensional article comprising:
    loading a metal platen (8) into a build chamber (6);
    performing concurrent processes for calibration including:

operating a movement mechanism (12) to vertically translate the platen (8);

operating a laser system (14) to impinge a radiation beam directly upon an upper surface (10) of the platen (8); and receiving a signal from an acoustic sensor (18) that is positioned within the build chamber (6);

analyzing the signal including determining a height of maximum laser convergence; and based upon the analysis, adjusting the height of maximum laser convergence to a build plane height.

2. The method of claim 1 wherein the metal platen upper surface (10) is titanium.

3. The method of claim 1 wherein the vertical translation includes downward motion from an upper position to a lower position.

4. The method of claim 1 wherein the vertical translation includes upward motion from a lower position to an upper position.

5. The method of claim 1 wherein determining the height of maximum laser convergence includes identifying a height of the upper surface of the platen corresponding to a maximized acoustic signal indicated by the acoustic sensor (18).

6. The method of claim 1 wherein the concurrent processes are performed when ambient air is within the build chamber (6).

7. The method of claim 6 further comprising:

evacuating the ambient air from the build chamber (6); and backfilling the build chamber with an inert gas.

8. The method of claim 7 further comprising the steps of fabrication:

operating the movement mechanism (12) to position the upper surface (10) of the metal platen (8) near the build plane;

operating a powder dispenser (40) to dispense a layer of powder (42) over the upper surface (10);

operating the laser system (14) to selectively melt the layer of powder (42);

repeating operating the movement mechanism (12), the powder dispenser (40), and the laser system (14) to complete fabrication of the article (36).

9. A three-dimensional printing system for manufacturing a three-dimensional article comprising:

a build chamber (6);

a metal platen (8) loaded into the build chamber (6);

a laser system (14);

an acoustic sensor (18) positioned within the build chamber (6); and a controller configured to:

perform concurrent processes for calibration including:

operate a movement mechanism (12) to lower the platen (8) from an upper position to a lower position;

operate the laser system (14) to impinge a radiation beam directly upon an upper surface (10) of the platen (8); and receive a signal from the acoustic sensor (18);

analyze the signal including determining a height of maximum laser convergence; and based upon the analysis, adjust the maximum laser convergence height to a build plane height.

10. The three-dimensional system of claim 9 wherein the metal platen upper surface (10) is titanium.

11. The three-dimensional system of claim 9 wherein the concurrent processes are performed when ambient air is within the build chamber (6).

12. The three-dimensional system of claim 9, wherein the controller is further configured for fabrication to:

operate the movement mechanism (12) to position the upper surface (10) of the metal platen (8)

near the build plane (38);

operate a powder dispenser (40) to dispense a layer of powder (42) over the upper surface (10);

operate the laser system (14) to selectively melt the layer of powder (42);

repeat operating the movement mechanism (12), the powder dispenser (40), and the laser system (14) to complete fabrication of the article (36).

13. The method of claim 2 wherein the vertical translation includes downward motion from an upper position to a lower position.

14. The method of claim 2 wherein the vertical translation includes upward motion from a lower position to an upper position.

15. The method of claim 2 wherein determining the height of maximum laser convergence includes identifying a height of the upper surface of the platen corresponding to a maximized acoustic signal indicated by the acoustic sensor (18).

16. The method of claim 3 wherein determining the height of maximum laser convergence includes identifying a height of the upper surface of the platen corresponding to a maximized acoustic signal indicated by the acoustic sensor (18).

17. The method of claim 4 wherein determining the height of maximum laser convergence includes identifying a height of the upper surface of the platen corresponding to a maximized acoustic signal indicated by the acoustic sensor (18).

18. The method of claim 5 wherein the concurrent processes are performed when ambient air is within the build chamber (6).

19. The three-dimensional system of claim 10, wherein the controller is further configured for fabrication to:

operate the movement mechanism (12) to position the upper surface (10) of the metal platen (8) near the build plane (38);

operate a powder dispenser (40) to dispense a layer of powder (42) over the upper surface (10);

operate the laser system (14) to selectively melt the layer of powder (42);

repeat operating the movement mechanism (12), the powder dispenser (40), and the laser system (14) to complete fabrication of the article (36).

20. The three-dimensional system of claim 11, wherein the controller is further configured for fabrication to:

operate the movement mechanism (12) to position the upper surface (10) of the metal platen (8) near the build plane (38);

operate a powder dispenser (40) to dispense a layer of powder (42) over the upper surface (10);

operate the laser system (14) to selectively melt the layer of powder (42);

repeat operating the movement mechanism (12), the powder dispenser (40), and the laser system (14) to complete fabrication of the article (36).

* * * * *